United States Patent
Wilson et al.

(10) Patent No.: US 11,846,788 B2
(45) Date of Patent: Dec. 19, 2023

(54) THERMOFORM WINDSHIELD STACK WITH INTEGRATED FORMABLE MOLD

(71) Applicant: Racing Optics, Inc., Las Vegas, NV (US)

(72) Inventors: Stephen S. Wilson, Las Vegas, NV (US); Bart E. Wilson, Las Vegas, NV (US); Roger Cone, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 0 days.

(21) Appl. No.: 17/813,494

(22) Filed: Jul. 19, 2022

(65) Prior Publication Data

US 2022/0350055 A1 Nov. 3, 2022

Related U.S. Application Data

(63) Continuation-in-part of application No. 16/778,928, filed on Jan. 31, 2020, now Pat. No. 11,524,493.
(Continued)

(51) Int. Cl.
*B29C 33/38* (2006.01)
*G02B 3/00* (2006.01)
(Continued)

(52) U.S. Cl.
CPC ........ *G02B 3/0012* (2013.01); *B29C 33/3835* (2013.01); *B29D 11/00298* (2013.01);
(Continued)

(58) Field of Classification Search
CPC .......... B29C 33/3835; B29D 11/00298; B29K 2667/003
(Continued)

(56) References Cited

U.S. PATENT DOCUMENTS 1,337,036 A 4/1920 Bergmann
1,366,907 A 2/1921 Dunand
(Continued)

FOREIGN PATENT DOCUMENTS

AU 2005244595 A1 7/2006
AU 2015277196 A1 1/2017
(Continued)

OTHER PUBLICATIONS

*Racing Optics, Inc. v. Aevoe Corp. DBA Moshi*; Case 2:15-cv-01774-RCJ-VCF; "Answer to Aevoe's Counterclaims—Jury Trial Demanded"; Nov. 2, 2015; 15 pages.
(Continued)

*Primary Examiner* — Jeffrey M Wollschlager
*Assistant Examiner* — Xue H Liu
(74) *Attorney, Agent, or Firm* — STETINA BRUNDA GARRED AND BRUCKER

(57) ABSTRACT

Manufacturing a pre-molded stack of one or more lenses to be installable on a curved substrate such as a vehicle windshield includes placing a moldable stack of one or more lenses and adhesive layer(s) on a mold, applying heat and pressure to the moldable stack to produce a pre-molded stack of one or more lenses from the moldable stack, and removing the pre-molded stack from the mold. The pre-molded stack may have a compound curvature, which may match a curvature of the curved substrate. The mold may be formed using three-dimensional shape data derived from the curved substrate, such as by optically scanning the curved substrate.

18 Claims, 5 Drawing Sheets

Related U.S. Application Data

(60) Provisional application No. 62/799,880, filed on Feb. 1, 2019.

(51) Int. Cl.
   *B29D 11/00* (2006.01)
   *B60J 3/00* (2006.01)
   *B29K 667/00* (2006.01)
   *B29K 67/00* (2006.01)
   *B60J 1/20* (2006.01)

(52) U.S. Cl.
   CPC ........ *G02B 3/0068* (2013.01); *B29K 2067/00* (2013.01); *B29K 2667/003* (2013.01); *B29K 2995/0025* (2013.01); *B29K 2995/0053* (2013.01); *B60J 1/2094* (2013.01); *B60J 3/00* (2013.01)

(58) Field of Classification Search
   USPC ...................................................... 264/1.32
   See application file for complete search history.

(56) References Cited

U.S. PATENT DOCUMENTS

| | | |
|---|---|---|
| 2,138,086 A | 11/1938 | Blodjer |
| 2,248,331 A | 7/1941 | Blodjer |
| 2,328,687 A | 9/1943 | Serr |
| 2,339,280 A | 1/1944 | Madson |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Morgan |
| 3,475,766 A | 11/1969 | Raschke |
| 3,577,565 A | 5/1971 | Feldmann et al. |
| 3,605,115 A | 9/1971 | Bohner |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | Hodnett, III |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Spicer et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,067,475 A | 11/1991 | Posnansky |
| 5,071,206 A | 12/1991 | Hood et al. |
| H1023 H | 3/1992 | Wiseman |
| 5,104,929 A | 4/1992 | Bilkadi |
| 5,113,528 A | 5/1992 | Burke, Jr. et al. |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,471,036 A | 11/1995 | Sperbeck |
| 5,473,778 A | 12/1995 | Bell |
| 5,486,883 A | 1/1996 | Candido |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |

(56) References Cited

U.S. PATENT DOCUMENTS

| | | |
|---|---|---|
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,709,825 A | 1/1998 | Shih |
| 5,740,560 A | 4/1998 | Muoio |
| 5,792,535 A | 8/1998 | Weder |
| 5,806,102 A | 9/1998 | Park |
| 5,815,848 A | 10/1998 | Jarvis |
| 5,819,311 A | 10/1998 | Lo |
| 5,846,659 A | 12/1998 | Loewer et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,173,447 B1 | 1/2001 | Arnold |
| 6,217,099 B1 | 4/2001 | Mckinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Inday |
| 6,388,813 B1 | 5/2002 | Wilson et al. |
| 6,403,005 B1 | 6/2002 | Mientus et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,491,390 B1 | 12/2002 | Provost |
| 6,506,496 B1 | 1/2003 | Frugier et al. |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,750,922 B1 | 6/2004 | Benning |
| 6,773,778 B2 | 8/2004 | Onozawa et al. |
| 6,777,055 B2 | 8/2004 | Janssen et al. |
| 6,800,378 B2 | 10/2004 | Hawa et al. |
| 6,811,857 B1 | 11/2004 | Bravet et al. |
| 6,838,610 B2 | 1/2005 | De Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,922,850 B1 | 8/2005 | Arnold |
| 6,952,950 B2 | 10/2005 | Doe et al. |
| 6,967,044 B1 | 11/2005 | O'Brien |
| D512,797 S | 12/2005 | Canavan et al. |
| 6,995,976 B2 | 2/2006 | Richardson |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | Mccormick |
| 7,425,369 B2 | 9/2008 | Oakey et al. |
| D586,052 S | 2/2009 | Elias |
| 7,495,895 B2 | 2/2009 | Carnevali |
| 7,629,052 B2 | 12/2009 | Brumwell |
| 7,631,365 B1 | 12/2009 | Mahan |
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,752,682 B2 | 7/2010 | Vanderwoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,011,137 B2 | 9/2011 | Durfield et al. |
| 8,024,818 B1 | 9/2011 | Davenport |
| 8,044,942 B1 | 10/2011 | Leonhard et al. |
| 8,101,277 B2 | 1/2012 | Logan et al. |
| 8,261,375 B1 | 9/2012 | Reaux |
| 8,294,843 B2 | 10/2012 | Hollaway |
| 8,361,260 B1 | 1/2013 | Wilson et al. |
| D683,077 S | 5/2013 | Klotz et al. |
| 8,455,105 B2 | 6/2013 | Hobeika et al. |
| 8,487,277 B2 | 7/2013 | Labrot et al. |
| 8,519,362 B2 | 8/2013 | Labrot et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,734,953 B2 | 5/2014 | Sablayrolles et al. |
| 8,859,080 B2 | 10/2014 | Thellier et al. |
| 8,889,801 B2 | 11/2014 | Liao et al. |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 | 9/2016 | Hines et al. |
| 9,471,163 B2 | 10/2016 | Wilson et al. |
| 9,477,022 B2 | 10/2016 | Laluet et al. |
| 9,526,290 B2 | 12/2016 | Wilson |
| 9,575,231 B2 | 2/2017 | Chu et al. |
| D781,507 S | 3/2017 | Huh |
| D781,508 S | 3/2017 | Huh |
| 9,629,407 B2 | 4/2017 | Foster |
| 9,726,940 B2 | 8/2017 | Tomiyasu |
| D805,256 S | 12/2017 | Yang |
| 9,846,265 B2 | 12/2017 | Ehrensperger et al. |
| 9,905,297 B2 | 2/2018 | Best |

(56) References Cited

U.S. PATENT DOCUMENTS

| | | |
|---|---|---|
| D815,190 S | 4/2018 | Dellemann |
| 9,968,155 B2 | 5/2018 | Wilson |
| 10,070,678 B2 | 9/2018 | Wilson |
| 10,165,819 B2 | 1/2019 | Klotz et al. |
| 10,226,095 B2 | 3/2019 | Wilson |
| 10,227,501 B2 | 3/2019 | Hwang et al. |
| D849,240 S | 5/2019 | Guo et al. |
| 10,300,680 B2 | 5/2019 | Laluet |
| D850,256 S | 6/2019 | Ryszawy |
| 10,321,731 B2 | 6/2019 | Wilson |
| 10,345,934 B2 | 7/2019 | Wilson et al. |
| 10,427,385 B2 | 10/2019 | Wilson et al. |
| 10,520,756 B2 | 12/2019 | Gallina et al. |
| D879,384 S | 3/2020 | Sato |
| D882,182 S | 4/2020 | Fekete |
| 10,620,670 B2 | 4/2020 | Wilson et al. |
| 10,625,663 B2 | 4/2020 | Laluet |
| 10,687,569 B1 | 6/2020 | Mcdirmid |
| 10,688,757 B2 | 6/2020 | Laluet et al. |
| 10,716,172 B2 | 7/2020 | Weissenberger et al. |
| 10,716,986 B2 | 7/2020 | Winter et al. |
| 10,739,669 B2 | 8/2020 | Schiavoni et al. |
| 10,831,092 B2 | 11/2020 | Schiavoni et al. |
| D907,299 S | 1/2021 | Brown, II et al. |
| D907,300 S | 1/2021 | Brown, II et al. |
| 11,027,528 B2 | 6/2021 | Laluet et al. |
| D925,129 S | 7/2021 | Wilson |
| D925,834 S | 7/2021 | Babin et al. |
| 11,141,959 B2 | 10/2021 | Wilson et al. |
| 11,147,323 B1 | 10/2021 | Wilson |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0133035 A1 | 6/2005 | Yahiaoui et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0231979 A1 | 9/2008 | Chen |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0033442 A1 | 2/2010 | Kusuda et al. |
| 2010/0102197 A1 | 4/2010 | Mcintyre |
| 2010/0102476 A1* | 4/2010 | Higgins ............... B29C 51/36 |
| | | 264/219 |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0073773 A1 | 3/2011 | Labrot et al. |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0003431 A1 | 1/2012 | Huang |
| 2012/0030095 A1 | 2/2012 | Marshall et al. |
| 2012/0047614 A1 | 3/2012 | Choi |
| 2012/0068083 A1 | 3/2012 | Labrot et al. |
| 2012/0070603 A1 | 3/2012 | Hsu |
| 2012/0081792 A1 | 4/2012 | Neuffer |
| 2012/0137414 A1 | 6/2012 | Saylor |
| 2012/0180204 A1 | 7/2012 | Hawkins |
| 2012/0183712 A1 | 7/2012 | Leonhard et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0004719 A1 | 1/2013 | Thellier et al. |
| 2013/0045371 A1 | 2/2013 | O'Donnell |
| 2013/0089688 A1 | 4/2013 | Wilson et al. |
| 2013/0145525 A1 | 6/2013 | Arenson et al. |
| 2013/0247286 A1 | 9/2013 | Vanderwoude et al. |
| 2013/0252001 A1 | 9/2013 | Sablayrolles et al. |
| 2013/0293959 A1 | 11/2013 | Mcdonald |
| 2014/0020153 A1 | 1/2014 | Romanski et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2015/0033431 A1 | 2/2015 | Hofer Kraner et al. |
| 2015/0138627 A1 | 5/2015 | Ehrensperger et al. |
| 2015/0192707 A1 | 7/2015 | Ehrensperger et al. |
| 2015/0234209 A1 | 8/2015 | Miyamoto et al. |
| 2015/0258715 A1* | 9/2015 | Ohta ............... B29C 45/2602 |
| | | 264/219 |

(56) References Cited

U.S. PATENT DOCUMENTS

| | | | |
|---|---|---|---|
| 2015/0294656 A1 | 10/2015 | Hanuschak | |
| 2015/0309609 A1 | 10/2015 | Wilson et al. | |
| 2015/0349147 A1 | 12/2015 | Xi et al. | |
| 2015/0359675 A1 | 12/2015 | Wilson | |
| 2016/0011414 A1 | 1/2016 | Joseph | |
| 2016/0023442 A1 | 1/2016 | Faris | |
| 2016/0050990 A1 | 2/2016 | Hayes | |
| 2016/0073720 A1 | 3/2016 | Niedrich | |
| 2016/0231834 A1 | 8/2016 | Hardi | |
| 2016/0259102 A1 | 9/2016 | Taka | |
| 2016/0271922 A1 | 9/2016 | Uzawa et al. | |
| 2016/0291543 A1 | 10/2016 | Saito | |
| 2016/0318227 A1 | 11/2016 | Kim et al. | |
| 2017/0079364 A1 | 3/2017 | Paulson | |
| 2017/0129219 A1 | 5/2017 | Uebelacker et al. | |
| 2017/0173923 A1 | 6/2017 | Davis et al. | |
| 2017/0208878 A1 | 7/2017 | Kakinuma et al. | |
| 2017/0232713 A1 | 8/2017 | Mannheim Astete et al. | |
| 2017/0281414 A1 | 10/2017 | Wilson | |
| 2017/0305245 A1 | 10/2017 | Lux et al. | |
| 2017/0318877 A1 | 11/2017 | Yahiaoui et al. | |
| 2018/0029337 A1 | 2/2018 | Wilson et al. | |
| 2018/0042324 A1 | 2/2018 | King | |
| 2018/0052334 A1 | 2/2018 | Repko | |
| 2018/0094164 A1 | 4/2018 | Ito et al. | |
| 2018/0148578 A1 | 5/2018 | Ohta et al. | |
| 2018/0161208 A1 | 6/2018 | Huh | |
| 2018/0236753 A1 | 8/2018 | Wykoff, II et al. | |
| 2018/0242403 A1 | 8/2018 | Weissenberger et al. | |
| 2018/0295925 A1 | 10/2018 | Gagliardo et al. | |
| 2018/0338550 A1 | 11/2018 | Boulware et al. | |
| 2018/0370195 A1 | 12/2018 | Laluet et al. | |
| 2019/0001629 A1 | 1/2019 | Laluet | |
| 2019/0001870 A1 | 1/2019 | Laluet | |
| 2019/0021430 A1 | 1/2019 | Elliott | |
| 2019/0037948 A1 | 2/2019 | Romanski et al. | |
| 2019/0118057 A1 | 4/2019 | Winter et al. | |
| 2019/0209912 A1 | 7/2019 | Isserow et al. | |
| 2019/0212474 A1 | 7/2019 | Le Quang et al. | |
| 2020/0012180 A1 | 1/2020 | Schiavoni et al. | |
| 2020/0100657 A1 | 4/2020 | Lee et al. | |
| 2020/0115519 A1 | 4/2020 | Phillips et al. | |
| 2020/0124768 A1 | 4/2020 | Wilson | |
| 2020/0154808 A1 | 5/2020 | Inouye | |
| 2020/0178622 A1 | 6/2020 | Jascomb et al. | |
| 2020/0276792 A1 | 9/2020 | Laluet et al. | |
| 2020/0281301 A1 | 9/2020 | Wynalda, Jr. | |
| 2020/0370727 A1 | 11/2020 | Berard et al. | |
| 2020/0384740 A1 | 12/2020 | Berard et al. | |
| 2020/0384747 A1 | 12/2020 | Fukuda et al. | |
| 2021/0030095 A1 | 2/2021 | Reicher | |
| 2021/0298380 A1 | 9/2021 | Brown, II et al. | |
| 2021/0298390 A1 | 9/2021 | Sup, IV et al. | |
| 2021/0307425 A1 | 10/2021 | Keim | |
| 2021/0315291 A1 | 10/2021 | Votolato et al. | |
| 2021/0318553 A1 | 10/2021 | Gharabegian | |
| 2021/0321692 A1 | 10/2021 | Wilson | |
| 2021/0321693 A1 | 10/2021 | Wilson et al. | |
| 2021/0329999 A1 | 10/2021 | Ackerman | |
| 2021/0368886 A1 | 12/2021 | Swart et al. | |
| 2021/0386155 A1 | 12/2021 | Rose | |
| 2021/0394427 A1 | 12/2021 | Frisco et al. | |
| 2022/0015472 A1 | 1/2022 | Boza | |
| 2022/0024186 A1 | 1/2022 | Tondu et al. | |

FOREIGN PATENT DOCUMENTS

| | | | |
|---|---|---|---|
| DE | 3637188 A1 | 5/1988 | |
| DE | 19808535 A1 | 9/1999 | |
| DE | 202004010014 U1 | 4/2005 | |
| DE | 202020101562 U1 | 4/2020 | |
| DE | 202020101794 U1 | 4/2020 | |
| EP | 192075 A2 | 8/1986 | |
| EP | 671258 A2 | 9/1995 | |
| EP | 1471415 A2 | 10/2004 | |
| EP | 3157480 A1 | 4/2017 | |
| GB | 2310862 A | 9/1997 | |
| JP | 61017860 A | 1/1986 | |
| JP | S6117860 A | 1/1986 | |
| JP | 62053832 A | 3/1987 | |
| JP | 04314537 A | 11/1992 | |
| JP | 06143496 A | 5/1994 | |
| JP | 07021456 A | 1/1995 | |
| JP | 10167765 A | 6/1998 | |
| JP | 2002328613 A | 11/2002 | |
| JP | 2012183822 A | 9/2012 | |
| JP | 2014032222 A | 2/2014 | |
| JP | 2015128896 A | 7/2015 | |
| KR | 20120001292 A | 1/2012 | |
| TW | 200700793 A | 1/2007 | |
| TW | 201027992 A | 7/2010 | |
| WO | 0024576 A1 | 5/2000 | |
| WO | 03052678 A1 | 6/2003 | |
| WO | 2015009114 A1 | 1/2015 | |
| WO | 2015091425 A1 | 6/2015 | |
| WO | 2015093413 A1 | 6/2015 | |
| WO | 2015195814 A1 | 12/2015 | |
| WO | 2019006151 A1 | 1/2019 | |
| WO | 2019055267 A1 | 3/2019 | |

OTHER PUBLICATIONS

Gregory Brower et al.; "Complaint for Patent Infringement"; Sep. 15, 2015; 15 pages.

Jeffrey A. Silverstri et al.; "Answer to Complaint for Patent Infringement"; Oct. 7, 2015; 59 pages.

United States Patent and Trademark Office; Office Action for U.S. Appl. No. 15/090,681; dated Aug. 26, 2016; 8 pages.

List of References and considered by Examiner for U.S. Appl. No. 15/090,681; Receipt date Jun. 30, 2016; 3 pages.

List of References and considered by Examiner for U.S. Appl. No. 15/090,681; Receipt date Apr. 27, 2016; 4 pages.

Examiner's search strategy and results for U.S. Appl. No. 15/090,681; dated Aug. 21, 2016; 2 pages.

*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.

Exhibit 1—Invalidity Contentions re: '545 Patent Under LPR 1-8(b)-(d); at least as early as Jul. 1, 2016.

Exhibit 2—Invalidity Contentions re: '256 Patent Under LPR 1-8(b)-(d); at least as early as Jul. 1, 2016.

Exhibit 3—Invalidity Contentions re: '620 Patent Under LPR 1-8(b)-(d); at least as early as Jul. 1, 2016.

Exhibit 4—Invalidity Contentions re: '625 Patent Under LPR 1-8(b)-(d); at least as early as Jul. 1, 2016.

Exhibit 1002—U.S. Pat. No. 5,364,671 to Gustafson; Case IPR2016-01745; Inter Partes Review of U.S. Pat. No. 8,974,620; at east as early as Sep. 7, 2016; pp. 1-6.

Exhibit 1004—U.S. Pat. No. 7,351,470 to Draheim et al; Case IPR2016-01745; Inter Partes Review of U.S. Pat. No. 8,974,620; at least as early as Sep. 7, 2016; pp. 1-15.

Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.

Exhibit 1003—U.S. Pat. No. 6,250,765 to Murakami; Case IPR2016-01745; Inter Partes Review of U.S. Pat. No. 8,974,620; at least as early as Sep. 7, 2016; p. 1-8.

(56) References Cited

OTHER PUBLICATIONS

Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp. v. Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp. v. Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
*Aevoe Corp. v. Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp. v. Racing Optics, Inc.*; Power of Attorney; Case IPR2016-01745; Inter Partes Review of U.S. Pat. No. 8,974,620; at least as early as Sep. 7, 2016; pp. 1-4.
*Aevoe Corp v. Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp v. Racing Optics, Inc.*; Decision; Case IPR2016-01164; Inter Partes Review of U.S. Pat. No. 9,104,256; at least as early as Nov. 7, 2016; p. 1-24.
*Aevoe Corp v. Racing Optics, Inc.*; Decision; Case IPR2016-01166; Inter Partes Review of U.S. Pat. No. 9,274,625; at least as early as Nov. 7, 2016; p. 1-23.
*Aevoe Corp v. Racing Optics, Inc.*; Decision; Case IPR2016-01165; Inter Partes Review of U.S. Pat. No. 9,128,545; at least as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (dated Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.

Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; dated Jul. 8, 2020.
Prosecution History of Re-Examination U.S. Appl. No. 95/002,073 titled Touch Screen Protector; pp. 1-1,980.
www.store.moshimode.com; "iVisor AG for iPad 2 Black"; 2004-2010.
Defendant's Motion for Summary Judgment; Oct. 25, 2013; pp. 1-31.
Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
Dictionary.com (http://dictionary.reference.com) 2012.
*Racing Optics, Inc. v. Aevoe, Inc., d/b/a/ Moshi*; Case No. 15-cv-017744-JCM-VCF; Aevoe's Initial Disclosure Non-Infringement, Invalidity and Unenforceability Contentions (Redacted) dated Jan. 7, 2016.
Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.
*I-Blason LLC v. Aevoe, Inc. and Aevoe Corp.*; Case IPR2016-TBA; Petition for Inter Partes Review of U.S. Pat. No. 8,044,942 (including Exhibits 1001-1019).
Dupont Teijin Films, "Mylar Polyester Film—Optical Properties", Jun. 2003, 2 pages.
https://en.wikipedia.org/wiki/Black_body, "Black Body", Jul. 2009, 11 pages.
https://en.wikipedia.org/wiki/Infrared, "Infrared", Jul. 2009, 12 pages.
https://en.wikipedia.org/wiki/BoPET, "PET Film (biaxially oriented)", Jul. 2009, 4 pages.
Instashield LLC, Bionic Wrench® Inventor Creates Low-Cost Face Shield For Masses, Apr. 15, 2020, 3 pages.
Tom Zillich, Surrey manufacturer hopes to hit home run with face shield that clips to baseball cap, Apr. 29, 2020, 3 pages.

(56) References Cited

OTHER PUBLICATIONS

Opentip, Opromo Safety Face Shield Visor for Adult Kids, Protective Cotton Hat with Removable PVC Face Cover <https://www.opentip.com/product.php?products_id=11699030>, May 5, 2020, 3 pages.
Hefute, Hefute 5 Pcs Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref=sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.
Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.
Leigh Buchanan, These 2 Companies Are Making Face Shields for Everyone <https://www.inc.com/leigh-buchanan/face-shields-coronavirus-protection-open-source.html>, May 6, 2020, 8 pages.
Brim Shield, photographs, Apr. 21, 2020, 1 pages.
Hatshield, Shield Yourself With The Hatshield <https://www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Eli N. Perencevich, Moving Personal Protective Equipment Into the Community Face Shields and Containment of COVID-19, Apr. 29, 2020, 2 pages.
Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.
Saudi Basic Industries Corporation (SABIC); "The Department of Transportation [DOT] Guidebook"; Oct. 2016.
Hostaphan RBB, "Transparent, Temperature Stable Polyester Film for Cooking & Roasting Bags" Jul. 2016.
Hostaphan Win, "White, Long-Term Stable, Thermally Stable Polyester Film for PV Back Sheet Laminates"; Jul. 2016.
PCT Search Report & Written Opinion for PCT/US2019/054565 (dated Dec. 20, 2019).
PCT Search Report & Written Opinion for PCT/US2015/036248 (dated Sep. 16, 2015).
"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.
*Racing Optics, Inc.* v. *David Leon O'Neal, Edward M. Wallace and Clear View Racing Optics, LLC*; Case 3:07 CV 221; Includes: Exhibit A, Wilson et al. U.S. Pat. No. 6,847,492; and Exhibit B, Wilson et al. U.S. Pat. No. 7,184,217; 34 pages.
International Search Report; International Application No. PCT/US99/95128; Date of Completion: Jan. 18, 2000; 54 pages.
International Search Report; International Application No. PCT/US02/10971; Date of Completion: Nov. 20, 2002; 3 pages.
International Search Report; International Application No. PCT/US03/16284; Date of Completion: Mar. 9, 2004; 3 pages.
European Search Report for Application No. 15809930.9-107 / 3157480 (dated Dec. 15, 2017).
Canadian Office Action for Application Serial No. 2,952,436 (dated Nov. 15, 2019).
Canadian Office Action for Application Serial No. 2,952,436 (dated May 3, 2019).
Australian Examination Report for Application Serial No. 2015277196 (dated Oct. 18, 2018).
www.wikipedia.org, Refractive Index, Oct. 31, 2014.
www.wikipedia.org. "Black Body", Jul. 2009, 11 pages.
www.wikipedia.org. "Infrared", Jul. 2009, 12 pages.
www.wikipedia.org. "PET Film (biaxially oriented)", Jul. 2009, 4 pages.
PCT International Application No. PCT/US99/25128 with International Search Report, Date of Completion Jan. 18, 2000, 54 Pages.
English translation of TW201027992, "Monitor Protection Device for a Flat Panel Display", 11 pgs.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US20/24639, dated Jun. 11, 2020, 13 pages.
PCT International Search Report and Written Opinion for International Application No. PCT/US2020/049919; dated Nov. 27, 2020.
Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.
PCT International Search Report and Written Opinion for International Application No. PCT/US2020/062230; dated Feb. 8, 2021.
"Anti-reflective coating," Wikipedia, last updated Jul. 13, 2017 by Andy Dingley, <https://en.m.wikipedia.org/wiki/Anti-reflective_coating>.
"Monotonic function," Wikipedia, accessed May 24, 2017, <https://en.wikipedia.org/wiki/Monotonic_function>.
"Thin Film," Wikipedia, last updated Jun. 20, 2017, <https://en.wikipedia.org/wiki/Thin_film>.
"Tips to Get Quality Anti-Reflection Optical Coatings," Penn Optical Coatings, accessed May 24, 2017, <http://www.pennoc.com/tipsgetqualityantireflectionopticalcoatings/>.
Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxlC&lpg=PA339&dq=AR%20thick%20film%20coatings&pg=PA339#v=onepage&q=AR%20thick%20film%20coatings&f=false>.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.
MDS Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved on Sep. 29, 2021.
Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.
PCT International Search Report and Written Opinion for International Application No. PCT/US2017/044438, dated Oct. 23, 2017, 12 pages.
Chemical Book, "Benzophenone", https://www.chemicalbook.com/Chemical ProductProperty_EN_CB57 44679.htm, available at least as of 2017, accessed on line on Dec. 15, 2021 (Year: 2017).
Chemical Book, "Polymethylhydrosiloxane", https://www.chemicalbook.com/Chemical ProductProperty _EN_ CB3694969.htm, available at least as of 2017, accessed online on Dec. 15, 2021 (Year: 2017).
Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).
Hostaphan RBB biaxially oriented film data sheet (Year: 2011).
PCT International Search Report and Written Opinion for International Application No. PCT/US2020/024639; dated Jun. 11, 2020.
PCT International Search Report and Written Opinion for International Application No. PCT/US2021/026165, dated Jul. 9, 2021, 10 pages.
PCT International Search Report and Written Opinion for International Application No. PCT/US21/20421, dated May 20, 2021, 8 pages.
Wiseman, Sr., United States Statutory Invention Registration No. H1023, published Mar. 3, 1992, 7 pages.

(56) References Cited

OTHER PUBLICATIONS

Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).

Pearson Dental, "UV Protection Face Shields", https://www.pearsondental.com/catalog/subcat_thumb.asp?majcatid=750&catid=10149, available online at least as of Jan. 27, 2021 per Internet Archive, accessed online on Sep. 15, 2021. (Year: 2021).

Patent Cooperation Treaty, International Search Report and Written Opinion for International Application No. PCT/US2022/031823, dated Jul. 14, 2022, 11 pages.

Patent Cooperation Treaty, International Search Report and Written Opinion for International Application No. PCT/US23/26598, dated Sep. 12, 2023, 7 pages.

\* cited by examiner

THERMOFORM WINDSHIELD STACK WITH INTEGRATED FORMABLE MOLD

CROSS-REFERENCE TO RELATED APPLICATIONS

This application is a continuation-in-part of U.S. patent application Ser. No. 16/778,928, filed Jan. 31, 2020 and entitled "Thermoform Windshield Stack With Integrated Formable Mold," which relates to and claims the benefit of U.S. Provisional Application No. 62/799,880, filed Feb. 1, 2019 and entitled "Thermoform Windshield Stack With Integrated Formable Mold," the entire contents of each of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to transparent coverings for windows and, more particularly, to transparent coverings having multiple lenses stacked one over the other and adhered together by adhesive.

2. Related Art

There may be various advantages to affixing transparent lenses to curved substrates such as windshields (also referred to as windscreens). Such coverings may provide protection from pitting and cracking, tinting (e.g., for privacy), thermal insulation, blocking of ultraviolet (UV) radiation, and/or decoration. A stack of such transparent lenses may allow for easy tear-away as the outermost lens becomes dirty and obstructs the driver's vision, such as might occur in vehicles for off-road use.

While the surface of a typical windshield usually exhibits a compound curvature, the transparent lenses may themselves be flat, such as in the case of polyethylene terephthalate (PET) films manufactured in a roll-to-roll process. In order to install a flat film to a compound curved windshield surface, the film may be drape formed over the windshield, e.g., by laying the film over the windshield and applying heat to the uppermost surface to shrink or stretch the film to take the shape of the windshield. However, this process may result in uneven heating or overheating, which may cause optical distortion in the film and may result in areas where the film is not adequately adhered to the windshield. In addition, the efforts of the installer to apply pressure to the film with a card or squeegee may result in permanently scratching the visible surface during installation.

BRIEF SUMMARY

The present disclosure contemplates various systems and methods for overcoming the above drawbacks accompanying the related art. One aspect of the embodiments of the present disclosure is a method of installing a stack of two or more lenses on a curved substrate. The method may include placing a moldable covering on a curved substrate, the moldable covering including a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack. The method may include applying heat and pressure to the sacrificial layer and peeling off the sacrificial layer to reveal the stack of two or more lenses.

The curved substrate may be a compound curved substrate. The curved substrate may be a windshield.

The sacrificial layer may be more heat resistant than the outermost lens of the stack.

The sacrificial layer may be less scratch resistant than the outermost lens of the stack.

The sacrificial lens may comprise a biaxially oriented polyethylene terephthalate film. The biaxially oriented polyethylene terephthalate film may be able to withstand temperatures between room temperature and 220° C. for two hours.

The sacrificial lens may comprise an opaque polyester film. The outermost lens of the stack may comprise a transparent polyethylene terephthalate film.

Another aspect of the embodiments of the present disclosure is a moldable covering affixable to a curved substrate, the moldable covering may include a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack, the sacrificial layer being more heat resistant than the outermost lens of the stack.

The sacrificial lens may comprise a biaxially oriented polyethylene terephthalate film. The biaxially oriented polyethylene terephthalate film may be able to withstand temperatures between room temperature and 220° C. for two hours.

The sacrificial lens may comprise an opaque polyester film. The outermost lens of the stack may comprise a transparent polyethylene terephthalate film.

Another aspect of the embodiments of the present disclosure is a moldable covering affixable to a curved substrate. The moldable covering may include a stack of two or more lenses, an adhesive layer interposed between each pair of adjacent lenses from among the two or more lenses, and a sacrificial layer disposed on an outermost lens of the stack, the sacrificial layer including a sacrificial lens and a sacrificial adhesive interposed between the sacrificial lens and the outermost lens of the stack, the sacrificial layer being less scratch resistant than the outermost lens of the stack.

The sacrificial lens may comprise a biaxially oriented polyethylene terephthalate film. The biaxially oriented polyethylene terephthalate film may be able to withstand temperatures between room temperature and 220° C. for two hours.

The sacrificial lens may comprise an opaque polyester film. The outermost lens of the stack may comprise a transparent polyethylene terephthalate film.

Another aspect of the embodiments of the present disclosure is a method of manufacturing a pre-molded stack of lenses to be installable on a curved substrate. The method may comprise placing a moldable stack of lenses on a mold, the moldable stack of lenses including two or more lenses and an adhesive layer interposed between each pair of adjacent lenses from among the two or more lenses. The method may further comprise applying heat and pressure to the moldable stack of lenses to produce a pre-molded stack of lenses from the moldable stack of lenses and removing the pre-molded stack of lenses from the mold.

Another aspect of the embodiments of the present disclosure is a method of manufacturing a pre-molded stack of one or more lenses to be installable on a curved substrate. The method may comprise placing a moldable stack of one or more lenses on a mold, the moldable stack including one or more lenses and one or more adhesive layers provided respectively thereon. The method may further comprise applying heat and pressure to the moldable stack to produce a pre-molded stack of one or more lenses from the moldable stack of one or more lenses and removing the pre-molded stack of one or more lenses from the mold.

Either of the preceding two methods may comprise deriving three-dimensional shape data from the curved substrate and forming the mold using the three-dimensional shape data. The deriving of the three-dimensional shape data may include optically scanning the curved substrate. The curved substrate and the mold may be windshields of the same type. The mold may comprise a compound curved surface.

The applying of heat and pressure may include arranging a plurality of heaters on a frame positioned to direct the heaters toward the moldable stack. The applying of heat and pressure may include pressing the moldable stack with one or more rollers.

The moldable stack may include a sacrificial layer disposed on an outermost lens of the stack. The sacrificial layer may include a sacrificial lens and a sacrificial adhesive interposed between the sacrificial lens and the outermost lens of the stack. The sacrificial layer may be more heat resistant than the outermost lens of the stack. The sacrificial layer may be less scratch resistant than the outermost lens of the stack. The sacrificial lens may comprise a biaxially oriented polyethylene terephthalate film. The biaxially oriented polyethylene terephthalate film may be able to withstand temperatures between room temperature and 220° C. for two hours. The sacrificial lens may comprise an opaque polyester film. The outermost lens of the stack may comprise a transparent polyethylene terephthalate film.

Another aspect of the embodiments of the present disclosure is a pre-molded stack of two or more lenses installable on a curved substrate. The pre-molded stack may comprise a stack of two or more lenses and an adhesive layer interposed between each pair of adjacent lenses from among the two or more lenses. The pre-molded stack may have a compound curvature.

Each of the two or more lenses may comprise a biaxially oriented polyethylene terephthalate film.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a moldable covering including a stack of two or more lenses and an installation method thereof, as well as various embodiments of a pre-molded lens stack and method of manufacture thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
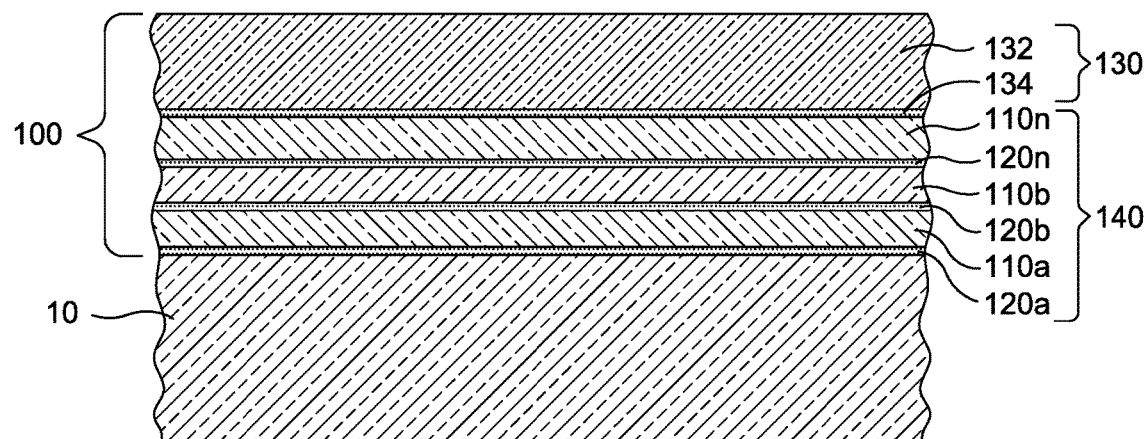
FIG. 1 is schematic side view of a moldable covering according to an embodiment of the present disclosure.

FIG. 1 is schematic side view of a moldable covering 100 according to an embodiment of the present disclosure. The moldable covering 100 may be affixed to a curved substrate 10 such as a windshield as part of the process of installing a stack of lenses 110a, 110b, 110n (collectively lenses 110). The installed stack of lenses 110 may provide the substrate 10 with protection, tinting, thermal insulation, blocking ultraviolet (UV) radiation, decoration, and/or the ability to peel away and discard the outermost layer 110n (and thereafter any newly revealed layers 110) as needed during the lifetime of the product. In addition to the lenses 110, the moldable covering 100 may include adhesive layers 120a, 120b, . . . 120n (collectively adhesive layers 120) provided respectively on each lens 110, such that an adhesive layer 120 is interposed between each pair of adjacent lenses 110 of the stack. On the outermost lens 110n of the stack of lenses 110, a sacrificial layer 130 may be provided to allow for an improved process of installing the stack of lenses 110 to the substrate 10. The sacrificial layer 130 may include a sacrificial lens 132 and a sacrificial adhesive 134 interposed between the sacrificial lens 132 and the outermost lens 110n of the stack of lenses 110. When installing the stack of lenses 110, heat and pressure may be applied to the sacrificial layer 130 to conform the stack of lenses 110 to the shape of the curved substrate 10. Thereafter, the sacrificial layer 130 may be peeled away to reveal the final product 140 including the installed lenses 110.

If one were to only drape form the stack of lenses 110 on the curved substrate 10 without the sacrificial layer 130, the process could result in uneven heating or overheating as explained above, as well as the possibility of permanently scratching the outermost lens 110n with a card or squeegee. The inventor has found that these difficulties stem largely from the lack of a female mold cavity to apply pressure as the stack of lenses 110 conforms to the male surface represented by the curved substrate 10. As a result, neither heat nor pressure is evenly distributed when the installer attempts to mold the stack of lenses 110 to the curved substrate 10, resulting in the stated difficulties. By providing the sacrificial layer 130 to serve as the missing female mold cavity, the disclosed moldable covering 100 may overcome these deficiencies in at least two ways. First, the sacrificial layer 130 may allow the installer to apply heat and pressure without fear of scratching or otherwise damaging the end product. The sacrificial layer 130 may simply be discarded along with any surface damage, while the underlying outermost lens 110n of the stack of lenses 110 remains unblemished. Second, as heat and pressure are applied to the stack of lenses 110 through the intervening sacrificial layer 130, the sacrificial layer 130 may serve to distribute the heat and pressure over a wider area, resulting in a more even application of heat and pressure as the sacrificial layer 130 and underlying stack of lenses 110 together conform to the shape of the curved substrate 10.

The lenses 110 may comprise a transparent polyethylene terephthalate (PET) film such as a biaxially-oriented polyethylene terephthalate (BoPET) and may be fabricated from sheets of polyester film sold under the registered trademark Mylar owned by the DuPont Company. The thickness of each lens 110 may be between 0.5 mil and 7 mil (1 mil is 0.001"), for example, 2 mil. Even after the adhesive material of the adhesive layers 120 is applied to a 2-mil thickness lens 110, the combined thickness of the 2-mil thickness lens 110 and adhesive layer 120 may still be 2 mil due to the adhesive layer 120 having only a nominal thickness.

The adhesive used in the adhesive layers 120 may be applied, for example, in selective areas around the periphery of the moldable covering 100 as described in U.S. Pat. No. 6,536,045 to Wilson, issued Mar. 25, 2003 and entitled "Tear-off Optical Stack Having Peripheral Seal Mount," the entire contents of which is expressly incorporated herein by reference. The adhesive layers 120 may be made of a clear optical low tack material and may comprise a water-based acrylic optically clear adhesive or an oil-based clear adhesive. The adhesive layer 120a used to affix the moldable covering 100 to the substrate 10 may be the same as or different from (e.g., stronger than) that of the adhesive layers 120b, . . . 120n interposed between each pair of adjacent lenses 110 of the stack. A stronger adhesive may be used, for example, in a case where individual lenses 110 are to be torn off without removing the entire stack of lenses 110 from the substrate 10 during use. Along the same lines, the adhesive used for the adhesive layers 120b, . . . 120n interposed between each pair of adjacent lenses 110 may be stronger than the sacrificial adhesive 134 of the sacrificial layer 130, such that the sacrificial layer 130 may be torn off without removing the outermost lens 110n from the stack of lenses 110. The sacrificial adhesive 134 may similarly be a low tack material and may comprise a water-based acrylic optically clear adhesive or an oil-based clear adhesive. However, in the case of the sacrificial adhesive 134, an opaque adhesive may be used instead since the sacrificial adhesive 134 is removed in the final product 140.

The lenses 110 may be optimized for scratch resistance and/or blocking (absorbing or reflecting) UV radiation. For example, an exterior side of each lens 110 may be deposited, sprayed, laminated, or otherwise coated with a coating (e.g., silicon ester acrylate oligomer and/or acrylated urethane polyol) that is optimized for scratch resistance and/or blocking UV radiation as desired for properties suitable to the finished product 140. These properties may be relaxed in the fabrication of the sacrificial layer 130, since the sacrificial layer 130 will not be present after the installation is complete. Thus, for example, the sacrificial layer 130 may be less scratch resistant than the outermost lens 120n of the stack of lenses 120. Meanwhile, the sacrificial layer 130 may be optimized for heat resistance, for example, coated with a coating (e.g., silicon ester acrylate oligomer and/or acrylated urethane polyol) that is optimized for heat resistance, since the sacrificial layer 130 may be heated directly as part of thermoforming the moldable covering 100 to the shape of the curved substrate 10. Such heat resistance properties may be relaxed in the underlying stack of lenses 100 as these lenses may only be subjected to the heat indirectly through the sacrificial layer 130. Thus, for example, the sacrificial layer 130 may be more heat resistant than the outermost lens 110n of the stack of lenses 100.

The sacrificial layer 130 may be made of a high temperature PET, for example, one that is able to withstand temperatures between room temperature and 220° C. for two hours (e.g., without deteriorating). The high temperature PET may be a clear BoPET, allowing for observation of the underlying stack of lenses 110 during the molding process, and may, for example, be a polyester film sold under the tradename Hostaphan RBB by the Mitsubishi Polyester Film Group. Such a high temperature BoPET may be preferred when using hot air to heat the sacrificial layer 130 during the molding process. Alternatively, the sacrificial layer 130 may be made of an opaque (e.g., white) polyester film such as one sold under the tradename Hostaphan WIN by the Mitsubishi Polyester Film Group. Such an opaque polyester film may provide increased thermal uniformity when using infrared heaters to heat the sacrificial layer 130 during the molding process.

While the sacrificial layer 130 (e.g., the sacrificial lens 132 and/or the sacrificial adhesive 134) may be optimized to withstand the heat of the installation process and to evenly distribute heat and pressure to the underlying stack of lenses 110, it is generally unnecessary for the sacrificial layer 130 to meet the more stringent performance standards of the underlying stack of lenses 110. For example, the stack of lenses may be designed to meet federal standards for visible light transmission (e.g., 70%), such as may be set forth in the American National Standards Institute (ANSI) standards Z26.1-1966 and Z26.1a-1969, as well as to resist scratching (e.g., by windshield wipers) as described above and/or to absorb or reflect UV light to protect the lenses 110 from sun damage. By relaxing these requirements in the sacrificial layer 130, while at the same time providing a more robust surface for applying heat and pressure without worry during installation, the moldable covering 100 may allow for a more efficient method of installing the stack of lenses 110. With the sacrificial layer 130 acting as a female mold cavity, the layers of lenses 110 and adhesive 120 are held, form, and cure better to the curved substrate 10 and never get scratched during the installation process.

Figure 2:
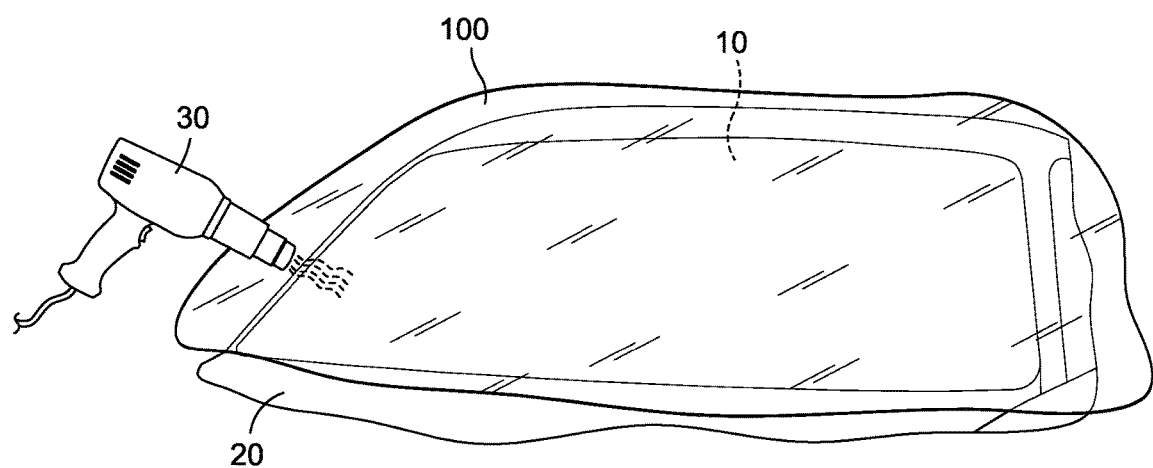
FIG. 2 shows the moldable covering placed on a windshield at the beginning of a process of applying heat and pressure to a sacrificial layer of the moldable covering.

FIG. 2 shows the moldable covering 100 placed on a windshield of a car 20, the windshield serving as the substrate 10, at the beginning of a process of applying heat and pressure to the sacrificial layer 130 of the moldable covering 100. The moldable covering 100 may be adhered to the windshield by a dry mount adhesive 120a (see FIG. 1) as disclosed, for example, in U.S. Pat. No. 9,295,297 to Wilson, issued Mar. 29, 2016 and entitled "Adhesive Mountable Stack of Removable Layers," the entire contents of which is expressly incorporated herein by reference. Alternatively, a wet mount adhesive 120a may be used as disclosed, for example, in U.S. Pat. No. 9,128,545 to Wilson, issued Sep. 8, 2015 and entitled "Touch Screen Shield," the entire contents of which is expressly incorporated herein by reference. Since the moldable covering 100 may be flat (e.g., having been manufactured in a roll-to-roll process), the moldable covering 100 may not initially conform to the curved shape of the windshield, resulting in regions of greater or less adhesion and pockets/bubbles of air between the moldable covering 100 and the windshield. Therefore, in order to conform the moldable covering 100 to the shape of the windshield, heat and pressure may be applied using a heater 30 such as a hot air source (e.g., a heat gun or blow dryer) or an infrared heater. At the same time, pressure may be applied to the moldable covering 100 using a card or squeegee. As the installer heats and presses down on the sacrificial layer 130 of the moldable covering 100, the sacrificial layer 130 may shrink and stretch to take on the contour of the opposing curved substrate 10 (the windshield) with the stack of lenses 110 therebetween. In this way, the sacrificial layer 130 may act as a female mold cavity to thermoform the underlying stack of lenses 110 to the shape of the windshield, evenly distributing the heat and pressure to shrink and stretch the lenses 110 to the correct shape and cure the adhesive layers 120.

Figure 3:
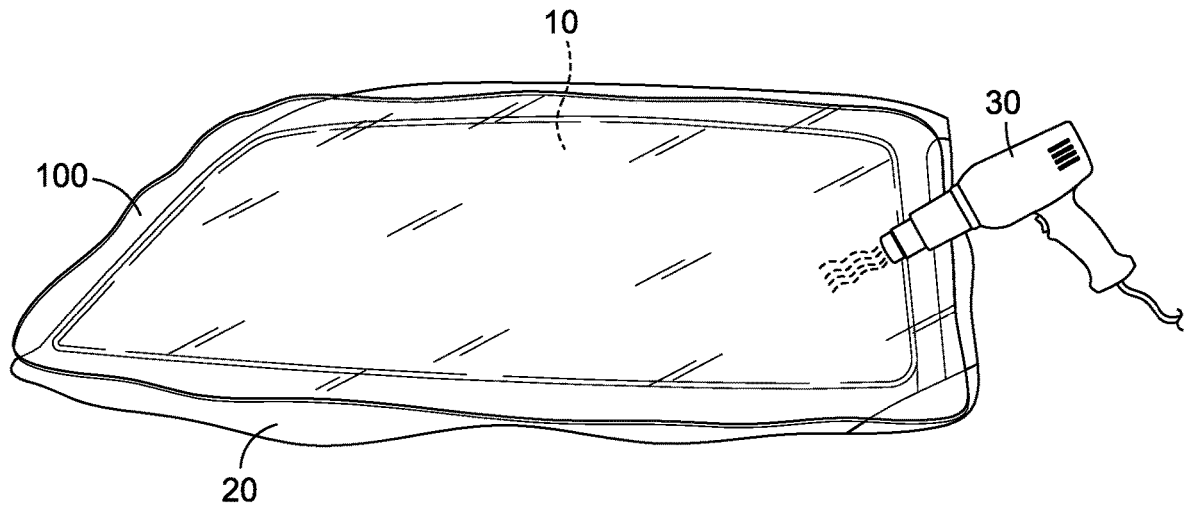
FIG. 3 shows the moldable covering on the windshield at the end of the process of applying heat and pressure.

FIG. 3 shows the moldable covering 100 on the windshield at the end of the process of applying heat and pressure. At this stage, the moldable covering 100, including the sacrificial layer 130 as well as the underlying lenses 110, is molded to the curved shape of the windshield without air pockets/bubbles. The upper surface of the sacrificial layer 130 may have various scratches and other blemishes caused by the installer as the installer applied pressure to the moldable covering 100 using a squeegee or card. However, the underlying lenses 110 have been protected by the sacrificial layer 130 and are thus untouched.

Figure 4:
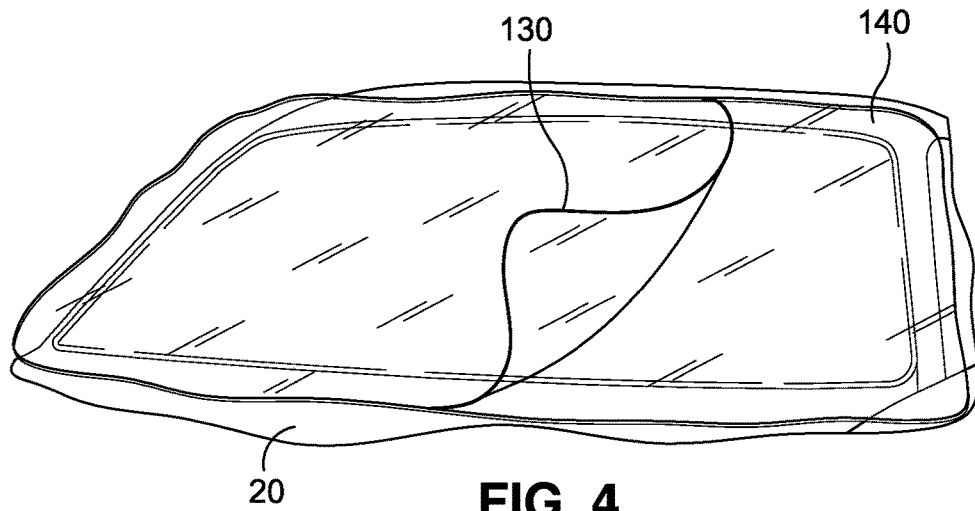
FIG. 4 shows the moldable covering on the windshield as the sacrificial layer is being peeled off to reveal a stack of transparent lenses.

FIG. 4 shows the moldable covering 100 on the windshield as the sacrificial layer 130 is being peeled off to reveal the stack of transparent lenses 110. Remaining on the windshield is the final product 140 (see FIG. 1) including the stack of lenses 110 and adhesive layers 120. The final product 140 may meet performance standards as described above, including federal standards for visible light transmission (e.g., 70%), as well as scratch resistance and/or UV absorption or rejection. The lenses 110 of the final product 140 may be accurately conformed to the shape of the windshield and may be free of blemishes, even on the outermost lens 110n. The peeled off sacrificial layer 130 may simply be discarded.

Figure 5:
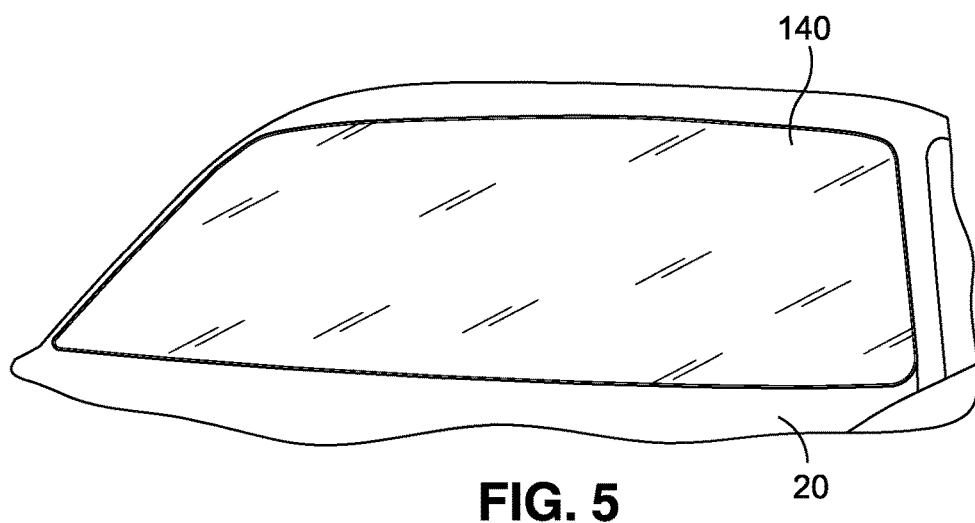
FIG. 5 shows the stack of transparent lenses after they have been trimmed to fit the windshield.

FIG. 5 shows the final product 140 including the stack of transparent lenses 110 after the stack of transparent lenses 110 has been trimmed to fit the windshield serving as the substrate 10. The stack of transparent lenses 110 may be trimmed using a knife such as a utility knife or box cutter with a stainless-steel blade (a carbon blade may damage the windshield). The trimming may be done after the sacrificial layer 130 has been removed from the moldable covering 100 as shown in FIG. 5, such that only the revealed final product 140 is trimmed. Alternatively, the trimming may be done prior to the removal of the sacrificial layer 130, once the moldable covering 100 has been conformed to the shape of the windshield as shown in FIG. 3. In either case, the resulting trimmed final product 140 may effectively be invisible as it matches the shape of the windshield beneath (though it may alter the coloring of the windshield as in the case of window tinting).

Figure 6:
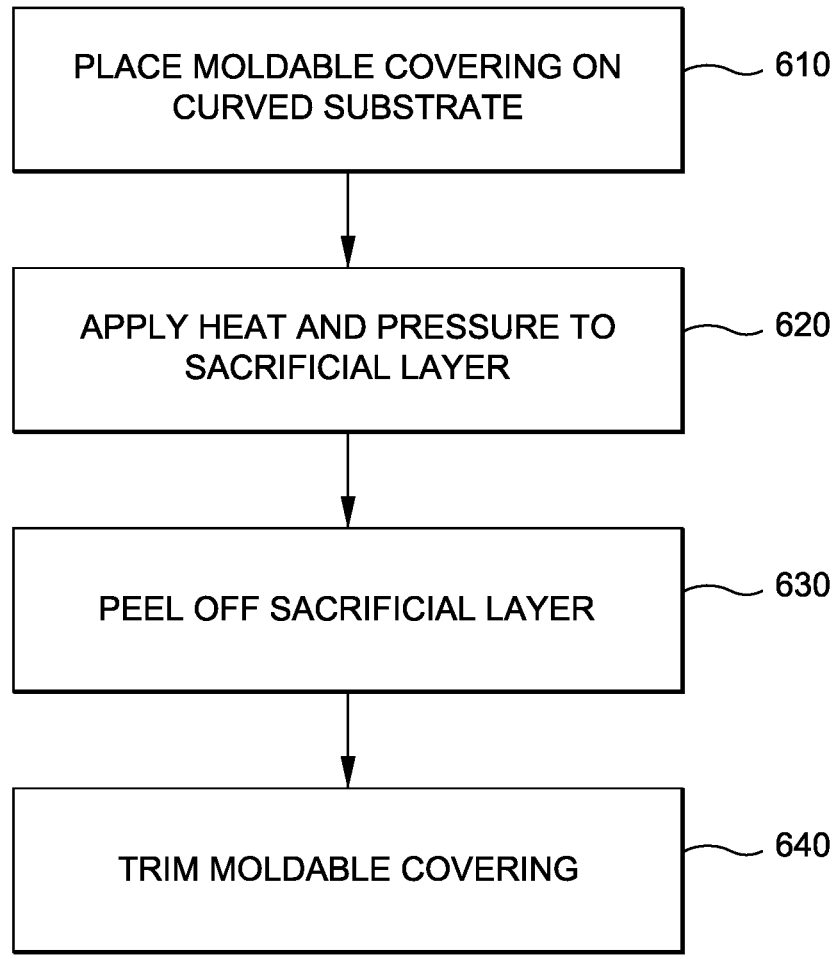
FIG. 6 shows an example operational flow according to an embodiment of the present disclosure.

FIG. 6 shows an example operational flow according to an embodiment of the present disclosure. The operational flow of FIG. 6 may serve as an example method of installing the final product 140 including the stack of lenses 110 shown in FIG. 1. First, the moldable covering 100, including both the final product 140 and the sacrificial layer 130, may be placed on a curved substrate 10 such as the windshield of the car 20 shown in FIG. 2 (step 610), with the adhesive layer 120a on the windshield and the sacrificial layer 130 facing outward away from the windshield. For easier installation, the moldable covering 100 may be rough cut (e.g., using an electric film cutter) so as not to extend too far outside the windshield. The operational flow may continue with applying heat and pressure to the sacrificial layer 130 of the moldable covering 100 as described in relation to FIGS. 2 and 3 in order to thermoform the moldable covering 100 to the curved shape of the windshield (step 620). After allowing the moldable covering 100 to cool down, the operational flow may conclude with peeling off the sacrificial layer 130 to reveal the final product 140 as described in relation to FIG. 4 (step 630) and performing a final trim as described in relation to FIG. 5 (step 640). As noted above, steps 630 and 640 may be performed in the order shown in FIG. 6 or in reverse order. The final product 140 including the stack of lenses 110 is now uniformly formed and affixed to the windshield surface.

As described above, aspects of the disclosed subject matter may produce a moldable covering 100 including a stack of lenses 110 that is molded in place on the end user's vehicle windshield or other curved substrate 10. To this end, the moldable covering 100 may include a sacrificial layer 130 that protects the underlying the stack of lenses 110 and servers as a female mold cavity, allowing for the easy and effective molding of the stack of lenses 110 by the installer using commonplace equipment (e.g., blow dryer and card) without risk of uneven heating or damage to the lenses 110. Whereas these aspects may be of great benefit to a user wishing to install the stack of lenses 110 him/herself with minimal risk as described above, there may be instances where further simplification of the installation process is desirable. For example, a user may be unable or unwilling (or simply lack confidence) to apply the necessary heat and pressure to mold the moldable covering 100 to the shape of his/her windshield 10 (step 620 of FIG. 6) or to subsequently trim the moldable covering (step 640 of FIG. 6). Therefore, to further ease the burden on the installer, additional aspects of the disclosed subject matter relate to the manufacture of a pre-molded stack of lenses 110 that is already molded into the shape of the vehicle windshield or other curved substrate 10 (and optionally already trimmed). The installer can simply apply the pre-molded stack of lenses 110 to the curved substrate 10 (e.g., by revealing and/or activating the adhesive layer 120a and placing the stack of lenses 110 on the curved substrate 10) without worrying about molding and/or trimming the lenses 110 to fit the curved substrate 10.

Figure 7:
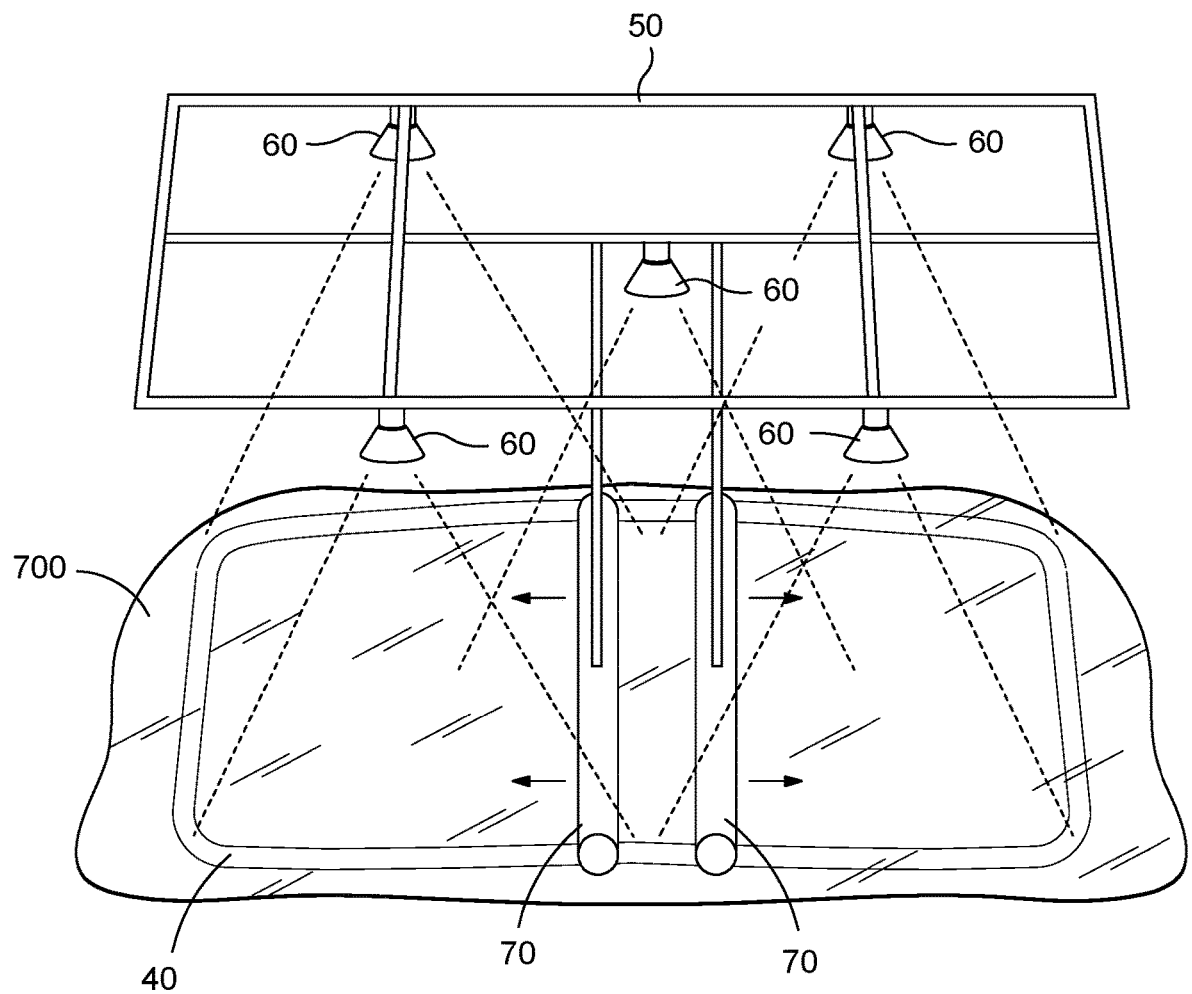
FIG. 7 shows a moldable stack of one or more lenses according to another embodiment of the present disclosure, together with a mold for producing a pre-molded stack of lenses and a frame for positioning a plurality of heaters and/or rollers.

With reference to FIGS. 1 and 7, the pre-molded stack of lenses 110 may be produced from a moldable stack 700 that may be identical to the moldable covering 100 as shown in FIG. 1 or to the previously described unmolded final product 140 thereof (i.e., the moldable covering 100 but without the sacrificial layer 130). That is, just as described above in relation to the moldable covering 100, the moldable stack 700 may include two or more lenses 110 and an adhesive layer 120 interposed between each pair of adjacent lenses from among the two or more lenses 110. (It is also noted that the final product 140 of FIG. 1 may likewise represent the pre-molded stack of lenses 110, i.e., the moldable stack 700 after it has undergone deformation as described herein.) As described in more detail below, the moldable stack 700 may typically be professionally molded to fit the curved substrate 10, using specialized equipment and a degree of expertise that poses less of a risk of uneven heating/pressure or scratching of the outermost lens 110n. Thus, the sacrificial layer 130 described above may typically be omitted. However, it is also contemplated that the sacrificial layer 130 may be included, with the moldable stack 700 thus being the same as the moldable covering 100 shown in FIG. 1.

Referring to FIG. 7, the moldable stack 700 may be placed on an appropriately shaped mold 40, in particular, one that matches the curvature (typically a compound curve) of the vehicle windshield or other substrate 10 on which the pre-molded stack of lenses 110 will eventually be installed. The mold 40 may serve as a lower (convex) mold and may comprise a compound curved surface. The mold 40 may, for example, be a windshield of the same type (e.g., model, shape, dimensions) as the substrate 10 on which the pre-molded stack of lenses 110 will be installed. In this regard, the manufacturer of the pre-molded stack of lenses 110 may maintain a variety of windshields currently available on the market to be used as respective molds 40. When an order is placed for a pre-molded stack of lenses 110, the order may include an indication of which type of windshield the stack of lenses 110 should be pre-molded to fit. The moldable stack 700 may then be molded into the pre-molded stack of lenses 110 using, as the mold 40, a windshield of the same type. Alternatively, the mold 40 may be formed using three-dimensional shape data of the windshield or other curved substrate 10 on which the pre-molded stack of lenses 110 will be installed. For example, the curved substrate 10 may be optically scanned to derive three-dimensional shape data such as a polygonal model (e.g., a wireframe), and the mold 40 may be formed to match the substrate 10 using the derived three-dimensional shape data. In this way, the mold 40 may be custom-formed to match the customer's windshield exactly.

Various techniques may be used to evenly apply heat and pressure to the moldable stack 700 while the moldable stack 700 is on the mold 40. FIG. 7 illustrates the use of a frame 50 (e.g., an aluminum truss or other lightweight support structure) that may be provided in proximity to the mold 40 and may support a plurality of heaters 60 for heating the moldable stack 700. The heaters 70 (e.g., hot air sources and/or infrared heaters) may be arranged on the frame 50 and directed toward the moldable stack 700. It is contemplated, for example, that the frame 50 may define a grid of attachment points, such as may be provided along the illustrated horizontal and vertical bars making up the example frame 50, with the heaters 60 being freely attachable to the frame 50 so as to be evenly spaced over the moldable stack 700 as desired. The exact positioning of the heaters 60 may be adjusted as needed depending on the size and shape of the mold 40, for example. While heating the moldable stack 700 with the heaters 60, the moldable stack 700 may be pressed with one or more rollers 70, which may likewise be attached to the frame 50, for example, on one or more tracks and/or pivot points. The rollers 70 may be made of a high-density foam and may typically comprise a pair of rollers 70 that press down on the moldable stack 700 at the middle and roll outward away from each other (in the direction of the arrows in FIG. 7) in order to press the moldable stack 700 downward against the mold 40 while allowing the material of the lenses 110 to deform outward.

Figure 8:
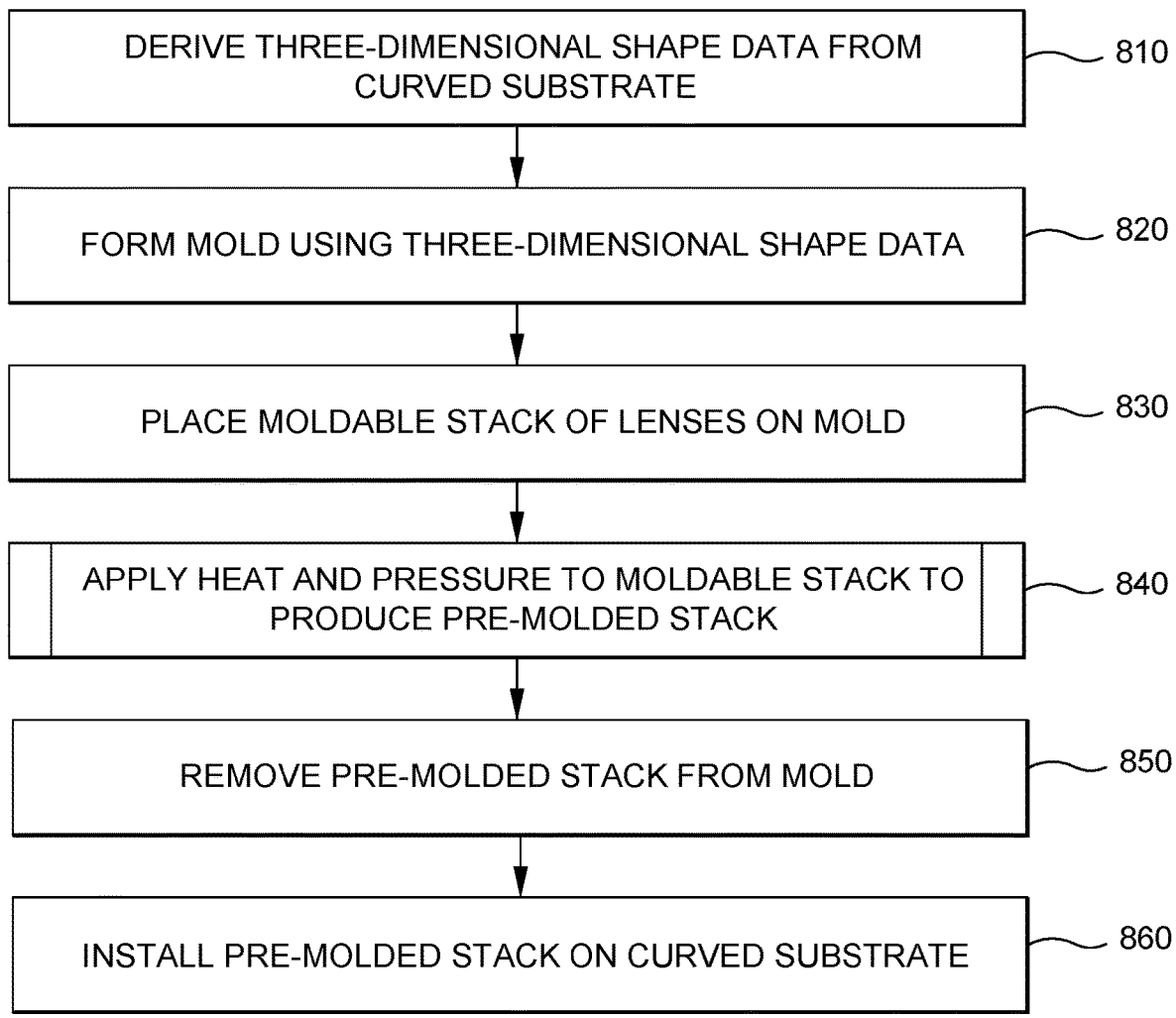
FIG. 8 shows an example operational flow according to another embodiment of the present disclosure.
Figure 9:
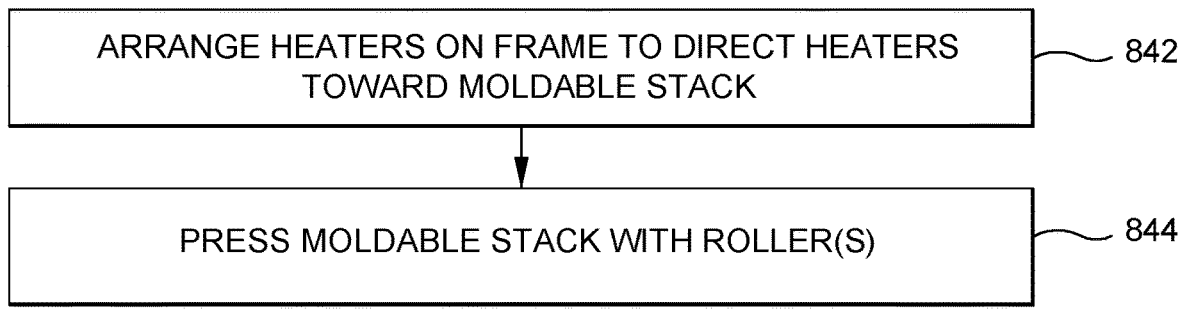
FIG. 9 shows an example sub-operational flow of step 840 in FIG. 8.

FIG. 8 shows an example operational flow according to another embodiment of the present disclosure, with FIG. 9 showing an example sub-operational flow of step 840 in FIG. 8. The operational flow of FIGS. 8 and 9 may serve as an example method of manufacturing a pre-molded stack of lenses 110 to be installable on a curved substrate 10. The operational flow may begin with deriving three-dimensional shape data associated with the curved substrate 10 on which the pre-molded stack of lenses 110 will eventually be installed (step 810), for example, by optically scanning the substrate 10, and forming a mold 40 (see FIG. 7) using the three-dimensional shape data (step 820). If the mold 40 is instead formed in advance, such as in a case where a variety of known windshield types are used as molds 40 as described above, steps 810 and 820 may be omitted. In this case, the mold 40 may simply be selected according to the particular curved substrate 10 on which the pre-molded stack of lenses 110 is intended to be installed. In either case, the operational flow may continue with placing the moldable stack 700 (having the lenses 110) on the mold 40 (step 830). As explained above, the moldable stack 700 may be identical to the moldable covering 100 shown in FIG. 1 or may omit the sacrificial layer 130.

Once the moldable stack 700 is on the mold 40, the operational flow of FIG. 8 may continue with applying heat and pressure to the moldable stack 700, thus producing the pre-molded stack of lenses 110 (step 840). In some cases, the process of applying heat and pressure may proceed in exactly the same was as described above in relation to FIGS. 2-5, except that the mold 40 is used instead of the actual substrate 10 where the pre-molded stack of lenses 110 will eventually be installed. In the case of using a simple handheld heat source and a squeegee or card to apply pressure, it may likewise be beneficial to the manufacturer of the pre-molded stack of lenses 110 for the moldable stack 700 to include the sacrificial layer 130. Preferably, however, specialized equipment may be used to ensure even heating and safe application of pressure without scratching of the outermost lens 110, rendering the sacrificial layer 130 unnecessary. For example, referring to the sub-operational flow of FIG. 9, the application of heat and pressure may be achieved by arranging heaters 60 on a frame 50 to direct the heaters 60 toward the moldable stack 700 as shown in FIG. 7 (step 842) and, further, by pressing the moldable stack 700 with one or more rollers 70 (step 844). In this way, heat and pressure may be evenly applied to the moldable stack 700 to promote the needed shrinking and stretching of the lenses 110 and curing of the adhesive layers 120.

After adequate heat and pressure has been applied to conform the moldable stack 700 to the shape of the mold 40, and typically following cooling and trimming of excess material around the mold 40 as described in relation to FIG. 5, above (as well as peeling off of the sacrificial layer 130, if applicable), the resulting pre-molded stack of lenses 110 may be removed from the mold 40 (step 850). The pre-molded stack of lenses 110 may then be shipped or otherwise delivered to the customer, who may install it on his/her own windshield or other curved substrate 10 with minimal effort (step 860). For example, a release liner or backing film may be provided on the innermost adhesive layer 120a of the pre-molded stack of lenses 110 during delivery, or the adhesive layer 120a may otherwise be in an inactive state. The customer may simply remove the release liner and place the stack of lenses 110 on his/her windshield 10, or may simply place the stack of lenses 110 on the windshield 10 and activate the adhesive layer 120a (e.g., by pressing the stack of lenses 110 against the windshield 10 in the case of a pressure sensitive adhesive). Because the stack of lenses 110 has been pre-molded (and optionally pre-trimmed) to fit the windshield 10, the customer need not concern him/herself with the process of molding the lenses 110 and requires no expertise or special equipment.

In the example of FIG. 1, which may illustrate both the moldable covering 100 and equally the moldable stack 700 (or pre-molded stack after deformation), three lenses 110 are shown. However, it is contemplated that the moldable covering 100, moldable stack 700, or pre-molded stack of lenses 110 may include a stack of four or more lenses 110, or a stack of two lenses 110 or even a single lens 110, with the number of lenses 110 depending on the particular application. Counterintuitively, the inventor has found that a stack of multiple lenses 110 is easier to thermoform to a curved substrate 10 (or to a mold 40) than a stack having a single lens 110.

Throughout this disclosure, the word "transparent" is used broadly to encompass any materials that can be seen through. The word "transparent" is not intended to exclude translucent, hazy, frosted, colored, or tinted materials.

The coatings described throughout this disclosure may be applied according to known methods such as spin coating, dip coating, or vacuum deposition.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a pre-molded stack of lenses to be installable on a curved substrate, the method comprising:
    prior to installation on the curved substrate, placing a moldable stack of lenses on a mold having a curvature matching that of the curved substrate, the moldable stack of lenses including two or more lenses and an adhesive layer interposed between each pair of adjacent lenses from among the two or more lenses;
    applying heat and pressure to the moldable stack of lenses to produce a pre-molded stack of lenses from the moldable stack of lenses; and
    removing the pre-molded stack of lenses from the mold for subsequent installation on the curved substrate.

2. The method of claim 1, further comprising:
    deriving three-dimensional shape data from the curved substrate; and
    forming the mold using the three-dimensional shape data.

3. The method of claim 2, wherein said deriving the three-dimensional shape data includes optically scanning the curved substrate.

4. The method of claim 1, wherein the mold is a windshield.

5. The method of claim 1, wherein the mold comprises a compound curved surface.

6. The method of claim 1, wherein said applying heat and pressure includes arranging a plurality of heaters on a frame positioned to direct the heaters toward the moldable stack of lenses.

7. The method of claim 1, wherein said applying heat and pressure includes pressing the moldable stack of lenses with one or more rollers.

8. The method of claim 1, wherein the moldable stack of lenses further includes a sacrificial layer disposed on an outermost lens of the stack, the sacrificial layer including a sacrificial lens and a sacrificial adhesive interposed between the sacrificial lens and the outermost lens of the stack.

9. The method of claim 8, wherein the sacrificial layer is more heat resistant than the outermost lens of the stack.

10. The method of claim 9, wherein the sacrificial layer is less scratch resistant than the outermost lens of the stack.

11. The method of claim 8, wherein the sacrificial layer is less scratch resistant than the outermost lens of the stack.

12. The method of claim 8, wherein the sacrificial lens comprises a biaxially oriented polyethylene terephthalate film.

13. The method of claim 12, wherein the biaxially oriented polyethylene terephthalate film can withstand temperatures between room temperature and 220° C. for two hours.

14. The method of claim 8, wherein the sacrificial lens comprises an opaque polyester film.

15. The method of claim 14, wherein the outermost lens of the stack comprises a transparent polyethylene terephthalate film.

16. A method of manufacturing a pre-molded stack of one or more lenses to be installable on a curved substrate, the method comprising:
    prior to installation on the curved substrate, placing a moldable stack of one or more lenses on a mold having a curvature matching that of the curved substrate, the moldable stack including one or more lenses and one or more adhesive layers provided respectively thereon;
    applying heat and pressure to the moldable stack to produce a pre-molded stack of one or more lenses from the moldable stack of one or more lenses; and
    removing the pre-molded stack of one or more lenses from the mold for subsequent installation on the curved substrate.

17. The method of claim 16, further comprising:
    deriving three-dimensional shape data from the curved substrate; and
    forming the mold using the three-dimensional shape data.

18. The method of claim 17, wherein said deriving the three-dimensional shape data includes optically scanning the curved substrate.

* * * * *